United States Patent [19]

Dowbenko et al.

[11] 3,997,485
[45] Dec. 14, 1976

[54] AMBIENT TEMPERATURE, MOISTURE CURABLE COATING COMPOSITIONS WHICH FORM FILMS HAVING EXCELLENT GLOSS

[75] Inventors: Rostyslaw Dowbenko, Gibsonia; Marvis E. Hartman, Pittsburgh, both of Pa.

[73] Assignee: PPG Industries, Inc., Pittsburgh, Pa.

[22] Filed: Feb. 11, 1975

[21] Appl. No.: 549,122

[52] U.S. Cl. .................... 260/22 S; 260/23 P; 260/824 R; 260/825; 260/827
[51] Int. Cl.² ................ C08G 63/48; C08L 67/08; C08L 83/10
[58] Field of Search .......... 260/22 S, 23 P, 824 R, 260/825, 827, 80 PS, 80.71

[56] References Cited

UNITED STATES PATENTS

| 2,848,425 | 8/1958 | Olson et al. ................. 260/22 S |
| 2,877,202 | 3/1959 | Olson .......................... 260/22 S |
| 3,015,637 | 1/1962 | Rauner et al. ................ 260/22 S |
| 3,423,376 | 1/1969 | Gobran et al. ............... 260/80.3 R |
| 3,467,634 | 9/1969 | Jacknow et al. .............. 260/80.71 |
| 3,480,584 | 11/1969 | Archer et al. ................ 260/86.1 R |
| 3,706,697 | 12/1972 | Backderf ....................... 260/80.71 |
| 3,706,709 | 12/1972 | Erikson et al. ................ 260/80.71 |
| 3,814,716 | 6/1974 | Kowalski et al. .............. 260/80.71 |

FOREIGN PATENTS OR APPLICATIONS 759,197  10/1956  United Kingdom .......... 260/22 S

*Primary Examiner*—Ronald W. Griffin
*Attorney, Agent, or Firm*—Frank J. Troy

[57] ABSTRACT

An ambient temperature, moisture curable coating composition which dries to form films having excellent gloss characteristics comprises a blend of (1) a silicon-containing acrylic interpolymer; (2) a graft copolymer having an alkyd resin backbone and a polymeric side chain segment of polymerized acrylic and organoalkoxysilane monomers; and (3) a cure accelerating catalyst.

19 Claims, No Drawings

AMBIENT TEMPERATURE, MOISTURE CURABLE COATING COMPOSITIONS WHICH FORM FILMS HAVING EXCELLENT GLOSS

BACKGROUND OF THE INVENTION

Most coating compositions employed in the coatings industry today require elevated curing temperatures (e.g., 300° F. to 500° F. or above) for curing purposes. However, as a result of the long term energy shortage facing the nation, the coatings industry has become increasingly interested in conserving the energy expended in curing coating compositions. This interest has lead to extensive activity in the development of coating compositions which are capable of being cured at relatively low temperatures (e.g., 250° F. or less) or which will air dry (i.e., cure in air) at ambient temperature.

As a result of intensive effort, an ambient temperature, moisture curable coating composition has now been developed; see our copending application Ser. No. 516,856, filed Oct. 22, 1974, now abandoned, incorporated herein by reference.

In the copending application, ambient temperature, moisture curable coating compositions comprising blends of certain acrylic-silane interpolymers and cure accelerating catalysts are disclosed. As discussed therein, such compositions have a number of advantageous properties, such as good cure rates and films produced therefrom exhibit excellent durability and good solvent resistance. However, such compositions while possessing many outstanding properties produce films having a lower than desirable initial degree of gloss for certain coating applications, such as, for example, in automobile refinish paints. Accordingly, it would be highly advantageous if the gloss characteristics of such ambient temperature, moisture curable coating compositions could be improved without sacrificing the advantageous properties of the compositions. The coating compositions of this invention achieve this result.

SUMMARY OF THE INVENTION

The present invention relates to ambient temperature, moisture curable coating compositions which form films having excellent gloss characteristics. The coating composition comprises a blend of three components: (1) an acrylic-silane interpolymer, (2) an acrylic-alkydsilane graft copolymer, and (3) a cure accelerating catalyst. These compositions have utility in general coating applications, but are particularly valuable in automobile refinishing.

DETAILED DESCRIPTION OF THE INVENTION

The acrylic-silane interpolymer component of the novel compositions of this invention is prepared by copolymerizing at least one ethylenically unsaturated monomer which is devoid of active hydrogen atoms with an organoalkoxysilane monomer using standard vinyl polymerization conditions and polymerization catalysts.

The ethylenically-unsaturated monomer employed in making the interpolymer herein can be virtually any monomer containing at least one $CH_2=C<$ group which is devoid of active hydrogen atoms, i.e., monomers which are devoid of hydroxyl, carboxyl or unsubstituted amide groups. Monomers containing such functional groups should be avoided in preparing the interpolymer since it has been found that such monomers can cause premature gelation of the interpolymers.

Examples of suitable ethylenically-unsaturated monomers employed in forming the interpolymer herein include the alkyl acrylates such as methyl acrylate, ethyl acrylate, butyl acrylate, propyl acrylate, 2-ethylhexyl acrylate, and the like; the alkyl methacrylates, such as methyl methacrylate, butyl methacrylate, 2-ethylhexyl methacrylate, decyl methacrylate, lauryl methacrylate, and the like; and unsaturated nitriles such as acrylonitrile, methacrylonitrile, and ethacrylonitrile. Still other unsaturated monomers which can be used include vinyl aromatic hydrocarbons, such as styrene, alpha methyl styrene, vinyl toluene, vinyl acetate, vinyl chloride, and the like, and epoxy functional monomers such as glycidyl methacrylate and the like.

In practice, in order to produce desirable properties in the interpolymer, it is preferred to use combinations of monomers which form hard polymer segments such as styrene, vinyl toluene and alkyl methacrylates having from 1 to 4 carbon atoms in the alkyl group with monomers which form soft polymer segments, such as the alkyl esters of acrylic or methacrylic acid, the alkyl groups having from one to 13 carbon atoms in the case of acrylic esters and from 5 to 16 carbon atoms in the case of methacrylic esters. Illustrative of monomers which form soft polymer segments are ethyl acrylate, butyl acrylate, 2-ethylhexyl acrylate, 2-ethylhexyl methacrylate, decyl methacrylate, lauryl methacrylate and the like. In addition to the hardening and softening monomers, as previously indicated, other monomers such as vinyl acetate, vinyl chloride, vinyl toluene, acrylonitrile and the like may be included to achieve specific properties in the interpolymer. The interpolymer may contain (i.e., be formed from) about 75 percent to about 95 percent, preferably from 85 to 95 percent, by weight of these ethylenically unsaturated monomers.

The other component of the interpolymer is an organoalkoxysilane compound. The preferred organoalkoxysilane compounds are the acrylatoalkoxysilanes, such as gamma-acryloxypropyltrimethoxysilane and the like, and the methacrylatoalkoxysilanes, such as gamma-methacryloxypropyltrimethoxysilane, gamma-methacryloxypropyltriethoxysilane, gamma-methacryloxypropyltris(2-ethoxyethoxy)silane, and the like. Of the methacrylatoalkoxysilanes, gamma-methacryloxypropyltrimethoxysilane is especially preferred due to its greater reactivity. Vinyl alkoxysilanes such as vinyltrimethoxysilane, vinyltriethoxysilane, and vinyltris(2-methoxyethoxy)silane are less effective than the acrylatoalkoxysilanes but may be used in certain instances.

The interpolymer may contain (i.e., be formed from) about 5 percent to about 25 percent, preferably from 5 to 15 percent, by weight of these organoalkoxysilane monomers.

As indicated heretofore, the second component of the composition is a graft copolymer having an alkyd resin backbone segment and a polymeric side chain segment of polymerized acrylic and organoalkoxysilane monomers. This component serves to impart increased gloss to films formed from the composition. One unique aspect of this graft copolymer component is that it is in and of itself capable of crosslinking in the presence of atmospheric moisture. Hence, this component can conveniently be termed a "reactive gloss additive."

The alkyd resin which forms the backbone segment of the graft copolymer is an oil-modified alkyd resin containing a minor proportion (i.e., up to about 25 percent) of an alpha, beta-ethylenically unsaturated compound (described below) which serves as a grafting site for the side chain segment monomers. For maximum gloss enhancement, the alkyd resin backbone is preferably made from saturated oils or saturated fatty acids (i.e., non-drying oils and fatty acids), although drying or semi-drying oil or fatty acids may be useful in certain instances. Typical non-drying oil fatty acids which may be utilized in preparing the alkyd resin backbone include cottonseed oil fatty acids, peanut oil fatty acids, olive oil fatty acids, coconut oil fatty acids, and the like with coconut oil fatty acid being preferred. In certain cases, a drying or semi-drying oil fatty acid such as tung oil fatty acid, linseed oil fatty acid, soybean oil fatty acid, tall oil fatty acid and the like may be useful.

The alkyd resin which forms the backbone segment herein will also contain a polyfunctional acid constituent, preferably an aromatic dicarboxylic acid such as isophthalic acid, terephthalic acid, orthophthalic acid, anhydrides of such acids and the like, or a saturated aliphatic dicarboxylic acid such as succinic, glutaric, adipic, pimelic, suberic, azelaic, brassic, dodecandoic, and the like, as well as anhydrides of such acids. The alkyd resin may also advantageously contain a monobasic acid constituent, such as benzoic acid, a substituted benzoic acid or a similar monobasic aromatic acid.

The alkyd resin which forms the backbone herein will also contain a polyhydric alcohol constituent which may be a polyol having 3 to 10 hydroxyl groups or a diol or a mixture of a polyol and a diol. Typical polyols which may be employed include trimethylol propane, trimethylol ethane, pentaerythritol, dipentaerythritol, glycerin, sorbitol, mannitol, hexanetriol, and the like. Diols which may be utilized include, for example, ethylene glycol, propylene glycol, diethylene glycol, dipropylene glycol, butane diol, pentane diol, decamethylene glycol, neopentyl glycol and the like.

As indicated above, the alkyd resin which forms the backbone segment of the graft copolymer contains a minor proportion of an alpha, beta-ethylenically unsaturated compound which serves as a grafting site for the side chain monomers. The alpha, beta-ethylenically unsaturated compound employed for that purpose is preferably an alpha, beta-ethylenically unsaturated acid such as crotonic acid, sorbic acid, maleic acid or fumaric acid. Crotonic acid is especially preferred. Other alpha, beta-ethylenically unsaturated acids may be useful provided that their tendency to homopolymerize is not excessive. The alkyd resin may contain from about 5 to about 25 percent of such alpha, beta-ethylenically unsaturated acids.

The alkyd resin backbone segment of the graft copolymer can be produced by any of the well known methods used to prepare alkyd resins for coatings. However, the preferred alkyd resin backbone should be very low in functionality, i.e., unreacted hydroxyl or carboxyl groups, prior to graft copolymerization of the side chain segment monomers on the backbone. The phrase "low in functionality" as employed herein means that the alkyd resin has an acid and carboxyl number of 5 mg. KOH/g or less. Methods of preparing alkyd resins which are low in functionality as defined above are well known in the art. Thus, for example, an alkyd resin of low functionality can be prepared by utilizing an excess of the polyhydric alcohol constituent and the esterification reaction then carried forward until substantially all of the carboxyl groups are reacted, following which any unreacted hydroxyl groups are acylated with acetic anhydride and any excess acetic anhydride or acetic acid from the acylation procedure is then removed by distillation, i.e., azeotropic distillation. As will be understood, the alkyd resin backbone may be contained in or be blended with a suitable solvent such as xylene, toluene, acetone or the like. The resultant low functionality alkyd resin forms the backbone segment onto which the side chain segment monomers are graft copolymerized.

The side chain segment of the graft copolymer is formed by adding side chain segment monomers to the alkyd resin backbone segment and then polymerizing the side chain monomers to form the graft copolymer. The side chain monomers may be added to the alkyd resin as such, along with a suitable polymerization catalyst or preferably in the form of a solution of the monomers in a suitable solvent such as xylene, toluene, acetone and the like. Free radical polymerization catalysts such as benzoyl peroxide, cumene hydroperoxide, azobis-isobutyronitrile and the like may be utilized.

The side chain monomers utilized in forming the graft copolymer consist of acrylic monomers and organoalkoxysilane monomers. Suitable acrylic monomers for use as side chain monomers include the alkyl acrylates such as methyl acrylate, ethyl acrylate, propyl acrylate, butyl acrylate and the like and the alkyl methacrylates such as methyl methacrylate, ethyl methacrylate, propyl methacrylate, butyl methacrylate, and the like. Suitable organoalkoxysilane monomers for use as side chain monomers are the acrylatoalkoxysilanes and methacrylatoalkoxysilane compounds discussed above. The graft copolymer may contain from about 5 to about 30 percent by weight of the above-described organoalkoxysilane compounds. The coating composition of the invention may contain from about 5 percent to about 40 percent, preferably 5 percent to 15 percent by weight of the graft copolymer based on the total non-volatile resin content of the composition.

The third component of the coating composition of this invention is a cure accelerating catalyst. Suitable cure accelerating catalysts include organic acids, alkyl acid phosphates, metallic salts of organic acids, and organic bases. Suitable organic acids include p-toluenesulfonic acid, n-butyphosphoric acid and the like. Suitable alkyl acid phosphates include monomethyl acid phosphate, monoethyl acid phosphate, monopropyl acid phosphate, monobutyl acid phosphate, as well as the corresponding dialkyl compounds such as dibutyl acid phosphate. A mixture of mono- and dialkyl phosphates may be utilized. In addition to the alkyl acid phosphates, examples of other acid catalysts which may be used include phosphoric acid, maleic acid and anhydride, fumaric acid, chloromaleic acid and anhydride, alkyl acid phthalates, such as methyl, ethyl, propyl and butyl acid phthalates, and monoalkyl succinates and maleates such as methyl, ethyl, propyl and butyl succinates and maleates. Organic bases such as isophorone diamine, methylene dianiline, imidazole and the like may be utilized. The preferred cure accelerating catalysts are metallic salts of organic acids, such as, for example, tin naphthenate, tin benzoate, tin octoate, tin butyrate, tin-2-ethylhexanoate, dibutyl tin dioctoate, dibutyltin dilaurate, dibutyltin diacetate, iron stannate, lead octate, and the like. Especially preferred cure accelerating catalysts are the organotin salts, such as dibutyltin dilaurate, dibutyltin diacetate, and the like.

The coating composition of the invention may contain from about 0.1 to about 5.0 percent, preferably from 0.1 to 3.0 percent, by weight of such catalysts, based on the total non-volatile resin content of the composition.

The coating compositions of this invention are prepared by blending the vehicle comprising the foregoing resinous components and cure accelerating catalysts in the proportions specified along with suitable solvents, such as xylene, toluene, butanol, acetone, methyl n-butyl ketone and the like and, if desired, a pigment composition. The pigments may be of any conventional type, and may include metallic pigments which produce a polychromatic finish. The coating compositions are applied by conventional techniques, such as spraying, and then permitted to air dry in the ambient atmosphere.

Set forth below are several examples of the several components of the compositions of the invention and the finished compositions. These examples are submitted for the purpose of further illustrating the invention and should not be regarded as a limitation on the scope thereof.

EXAMPLE A

This example illustrates the preparation of the silicon-containing acrylic interpolymer component utilized in the coating compositions of this invention. For a more detailed description of interpolymers of this type see our copending application referred to above.

A mixture of 407 grams of methyl n-butyl ketone and 407 grams of VM&P naphtha was added to a 5 liter flask equipped with a stirrer, thermometer, nitrogen inlet, dropping funnel, and a condenser equipped with a water trap. The mixture was heated to reflux and a solution consisting of 827 grams of isobutyl methacrylate, 150 grams isobornyl methacrylate, 396 grams styrene, 75 grams acrylonitrile, 75 grams gamma-methacryloxypropyltrimethoxysilane (based on monomer solids, the charge contains 55 percent isobutyl methacrylate, 10 percent isobornyl methacrylate, 25 percent styrene, 5 percent acrylonitrile and 5 percent gamma-methacryloxypropyltrimethoxysilane), 577 grams methyl-n-butyl ketone and 6.8 grams azobis(isobutyronitrile) was added dropwise over a period of 3 hours. After the monomer addition was complete, a solution of 153 grams of methyl n-butyl ketone, 102 grams VM&P naphtha and 6.0 grams of butyl peroxyisopropyl carbonate (hereinafter BPIC) was added dropwise to the reaction mixture over a one-hour period. Immediately following this addition, another 6.0 grams of BPIC was added to the reaction flask. At the end of 4 hours and 8 hours of refluxing, 6.0 grams of BPIC were added to the reaction flask. During the reaction period, covering a total time of about 12 hours, 1.4 milliliters of water were removed by azeotropic distillation. The resultant silicon-containing acrylic interpolymer had the following properties:

| 150° C. solids | 47.0 percent |
|---|---|
| Gardner-Holdt viscosity | K–L |
| GPC molecular weight | 48,000 |

EXAMPLE B

This example illustrates the preparation of an additional silicon-containing acrylic interpolymer utilized in the coating compositions of the invention.

In this example, the silicon-containing acrylic interpolymer was prepared utilizing substantially the same procedure set forth in Example A except that the monomer charge consisted of 50 percent methyl methacrylate, 25 percent styrene, 12 percent 2-ethylhexyl acrylate, 8 percent acrylonitrile and 5 percent gamma-methacryloxypropyltrimethoxysilane. The resultant silicon-containing acrylic interpolymer had a 150° C. solids content of 47.0 percent and a Gardner-Holdt viscosity of U-V.

EXAMPLE 1

This example illustrates the preparation of the alkyd-silane graft copolymer component (i.e., the gloss additive) of the compositions of this invention.

To a 5-liter flask equipped with a stirrer, thermometer, nitrogen inlet and a condenser equipped with a water separation trap were charged 300 grams of coconut fatty acid, 1200 grams of benzoic acid, 1080 grams of pentaerythritol, 600 grams of phthalic anhydride and 450 grams of crotonic acid. The mixture was heated to a temperature ranging from 200° to 240° C. for a period of about 32 hours during which time water was removed and the acid value dropped to 0.55. After this time period, the reaction mixture was cooled and 600 grams of xylene was added to the alkyd resin. The resin was analyzed and found to have the following properties:

| Acid value | 0.34 |
|---|---|
| Hydroxyl value | 91.2 |
| 150° C. solids | 79.2 percent |
| Gardner-Holdt viscosity | Z4–Z5 |

The above alkyd retained in the same reaction flask was then reacted with 660 grams of acetic anhydride to acylate the hydroxyl groups. After refluxing for 2 hours, 2500 grams of xylene were stripped from the reaction medium as fresh xylene was concurrently added to the mixture. In this manner, excess acetic anhydride and acetic acid was azeotropically removed from the resin solution. After this procedure, the alkyd resin product was analyzed with the following results:

| Acid value | 0.83 |
|---|---|
| Hydroxyl value | 0 |
| 150° C. solids | 77.6 percent |
| Gardner-Holdt viscosity | X |

To a 5 liter flask equipped with a stirrer, thermometer, nitrogen inlet and condenser, 1458 grams of this alkyd resin product was added. Then, 60 grams of gamma-methacryloxypropyltrimethoxysilane, 60 grams of butyl methacrylate, 12 grams of benzoyl peroxide and 200 grams of xylene were charged to the flask. The reaction mixture was then heated to 120° C. and refluxed for a period of 12 hours with 5.0 grams of BPIC being added after 3.6 and 9 hours of reflux time. The resultant graft copolymer was then cooled and analyzed with the following results:

| 150° C. solids | 69.1 percent |
|---|---|
| Gardner-Holdt viscosity | Q+ |
| Acid value | 0.97 |
| Hydroxyl value | 4.43 |

EXAMPLES 2-7

These examples illustrate the effect of the alkyd-silane graft copolymer additive of Example 1 on the gloss of films formed from the ambient temperature moisture curable coating compositions of the invention. In these examples, control compositions (i.e., Examples 2, 3, and 4) consisting of the silicon-containing acrylic interpolymer of Example A, aluminum pigment paste, solvent thinner, and cure accelerating catalyst and test compositions (i.e., Examples 5, 6, 7) consisting of the same ingredients plus the alkyd-silane graft copolymer were prepared by mixing the ingredients in standard paint mixing equipment utilizing standard mixing procedures. In the test compositions, the alkyd-silane graft copolymer additive was incorporated in an amount of 10 percent by weight of polymer solids. Composition formulations were as follows:

| | EXAMPLE NO. | | | | | |
|---|---|---|---|---|---|---|
| | 2 | 3 | 4 | 5 | 6 | 7 |
| | (Parts by Weight - grams) | | | | | |
| Silicon-containing acrylic interpolymer of Example A | 206.00 | 206.00 | 206.00 | 185.00 | 185.00 | 185.00 |
| Alkyd silane graft copolymer of Example 1 | — | — | — | 14.30 | 14.30 | 14.30 |
| Aluminum pigment paste (1) | 10.50 | 10.50 | 10.50 | 10.50 | 10.50 | 10.50 |
| Solvent thinner (2) | 184.00 | 184.00 | 184.00 | 191.00 | 191.00 | 191.00 |
| Cure accelerating catalyst solution (3) | 0.50 | 0.75 | 1.00 | 0.50 | 0.75 | 1.00 |
| Total | 401.0 | 401.25 | 401.50 | 401.30 | 401.55 | 401.80 |

(1) A pigment paste consisting of 37.2 percent by weight of AL-726 (a product of ALCOA corporation consisting of 60 percent aluminum flake and 40 percent inert material) and 62.8 percent by weight of the silicon-containing acrylic interpolymer of Example A.
(2) A solvent blend consisting of 19 percent acetone, 32 percent toluene, 10 percent xylene, 14 percent isopropanol and 25 percent cellosolve acetate.
(3) A 50 percent solution of dibutyltin dilaurate in toluene.

The above compositions were spray applied on metal panels and permitted to cure in the ambient atmosphere for 24 hours at room temperature and then tested for gloss. Test results are shown in Table I.

TABLE 1

| EXAMPLE NO. | PANEL 1 (20° Gloss) |
|---|---|
| 2 | 66 |
| 3 | 66 |
| 4 | 64 |
| 5 | 68 |
| 6 | 70 |
| 7 | 73 |

As the Examples clearly show, the alkyd-silane graft copolymer additive significantly improves the gloss of films formed from the test compositions.

EXAMPLES 8-9

These examples further illustrate the effect of the alkyd-silane graft copolymer additive on the gloss of films formed from the ambient temperature moisture-curable coating compositions of the invention. In these examples, coating compositions were prepared in substantially the same manner as in Examples 2-7, except that the silicon-containing acrylic interpolymer of Example B was employed. Composition formulations were as follows:

| | EXAMPLE NO. | |
|---|---|---|
| | 8 | 9 |
| | (Parts by Weight - Grams) | |
| Silicon-containing acrylic interpolymer of Example B | 206.00 | 185.00 |
| Alkyd-silane graft copolymer of Example 1 | — | 14.30 |
| Aluminum pigment paste as in Examples 2-7 | 10.50 | 10.50 |
| Solvent thinner as in Examples 2-7 | 184.00 | 191.00 |
| Cure accelerating catalyst as in Examples 2-7 | 0.50 | 0.50 |
| Total | 401.00 | 401.30 |

The above compositions were spray applied to metal panels and permitted to cure in the ambient atmosphere for 24 hours at room temperature. The films were then tested for gloss as in Examples 2-7. Test results are shown in Table II.

TABLE II

| Example No. | 20° Gloss |
|---|---|
| 8 | 62 |
| 9 | 68 |

According to the provisions of the Patent Statues, there are described above the invention and what are now considered to be its best embodiments. However, within the scope of the appended claims, it is to be understood that the invention can be practiced otherwise than as specifically described.

We claim:
1. In an ambient temperature moisture-curable coating composition which includes:
   A. an interpolymer of monomers consisting essentially of:
   1. from about 75 percent to about 95 percent by weight of interpolymer of at least one ethyleneically-unsaturated monomer which contains a $CH_2=C<$ group and is devoid of active hydrogen atoms;
   2. from about 5 percent to about 25 percent by weight of interpolymer of a copolymerizable organoalkoxysilane selected from the group consisting of acrylatoalkoxysilanes, methacrylatoalkoxysilanes, and vinylalkoxysilanes; and B. from about 0.5 to about 3 percent by weight of interpolymer solids of a cure-accelerating catalyst; the improvement which comprises the addition thereto of C. from about 5 percent to about 40 percent by weight of non-volatile polymer solids of a graft copolymer consisting of an oil-modified alkyd resin backbone and a polymeric side chain of polymerized organoalkoxysilane and acrylic monomer units wherein said alkyd resin backbone prior to graft copolymerization contains up to about 25 percent of an alpha, beta-ethylenically unsaturated compound and is very low in functionality, and wherein said graft copolymer contains from about 5 percent to about 30 percent by weight of the organoalkoxysilane compounds.

2. The coating composition of claim 1 wherein said ethylenically-unsaturated monomer is selected from the group consisting of alkyl acrylates, alkyl methacrylates, vinyl aromatic hydrocarbons and mono-unsaturated organic nitriles.

3. The coating composition of claim 1 wherein the methacrylatoalkoxysilane is selected from the group consisting of gamma-methacryloxypropyltrimethoxysilane, gamma-methacryloxypropyltriethoxysilane and gamma-methacryloxypropyltris(2-methoxyethoxy)silane.

4. The coating composition of claim 1 wherein the vinylalkoxysilane is selected from the group consisting of vinyltrimethoxysilane, vinyltriethoxysilane and vinyltris(2-methoxyethoxy)silane.

5. The coating composition of claim 1 wherein the cure accelerating catalyst is selected from the group consisting of organic acids, alkyl acid phosphates, metallic salts of organic acids, organic bases and mixtures thereof.

6. The coating composition of claim 1 wherein the alkyd resin backbone segment of the graft copolymer is the reaction product of a saturated oil fatty acid, a polyhydric alcohol, a polyfunctional acid or acid anhydride, and from about 5 percent to about 25 percent of an alpha, beta-ethylenically unsaturated acid.

7. The coating composition of claim 6 wherein the saturated oil fatty acid is coconut oil fatty acid.

8. The coating composition of claim 6 wherein the polyhydric alcohol is selected from the group consisting of polyols having from 3 to 10 carbon atoms, diols and mixtures thereof.

9. The coating composition of claim 6 wherein the polyhydric alcohol is pentaerythritol.

10. The coating composition of claim 6 wherein the polyfunctional acid or acid anhydride is selected from the group consisting of aromatic dicarboxylic acids, aromatic dicarboxylic acid anhydrides, aliphatic dicarboxylic acids, aliphatic dicarboxylic acid anhydrides and mixtures thereof.

11. The coating composition of claim 6 wherein the polyfunctional acid anhydride is phthalic anhydride.

12. The coating composition of claim 6 wherein the alpha, beta-methylenically unsaturated acid is selected from the group consisting of sorbic acid, crotonic acid, maleic acid and fumaric acid.

13. The coating composition of claim 6 wherein the alpha, beta-ethylenically unsaturated acid is crotonic acid.

14. The coating composition of claim 6 wherein the reaction product which forms the alkyd resin backbone further contains a monobasic acid.

15. The coating composition of claim 14 wherein the monobasic acid is benzoic acid.

16. The coating composition of claim 1 wherein the organoalkoxysilane monomers which are polymerized to form the polymeric side chain of the graft copolymer are selected from the group consisting of acrylatoalkoxysilanes, methacrylatoalkoxysilanes and vinylalkoxysilanes.

17. The coating composition of claim 1 wherein the polymerized organoalkoxysilane unit is polymerized gamma-methacryloxypropyltrimethoxysilane.

18. The coating composition of claim 1 wherein the acrylic monomers which are polymerized to form the polymeric side chain of the graft copolymer are selected from the group consisting of alkyl acrylates and alkyl methacrylates.

19. The coating composition of claim 1 wherein the polymerized acrylic monomer unit is polymerized butyl methacrylate.

* * * * *

UNITED STATES PATENT AND TRADEMARK OFFICE
CERTIFICATE OF CORRECTION

PATENT NO. : 3,997,485

DATED : December 14, 1976

INVENTOR(S) : Rostyslaw Dowbenko and Marvis E. Hartman

It is certified that error appears in the above-identified patent and that said Letters Patent are hereby corrected as shown below:

Column 10, line 18, "methylenically" should be --ethylenically--.

Signed and Sealed this

Twenty-second Day of March 1977

[SEAL]

Attest:

RUTH C. MASON
*Attesting Officer*

C. MARSHALL DANN
*Commissioner of Patents and Trademarks*